March 21, 1944.  J. L. BREESE  2,344,590
SPIRAL OIL FILTER
Filed March 13, 1941

Inventor.
James L. Breese.
by Parker & Carter
Attorneys.

Patented Mar. 21, 1944

2,344,590

UNITED STATES PATENT OFFICE 2,344,590

SPIRAL OIL FILTER

James L. Breese, Santa Fe, N. Mex., assignor to Oil Devices, Santa Fe, N. Mex., a limited partnership of Illinois Application March 13, 1941, Serial No. 383,078

6 Claims. (Cl. 210—166)

My invention relates to an improvement in float valves and has for one purpose the provision of improved filter means. My invention is particularly adaptable to float controls employed for controlling the flow of liquid fuels to oil burners or the like, but of course may have other uses.

Another purpose is the provision of an improved filter in which a spring may be employed as a filtering member.

Another purpose is the provision of an improved filter in which a plurality of discs, preferably of a springlike nature, may be employed.

Another purpose is the provision of improved filter means for float valves and the like in which the shell of the filter may be adjustably varied, for example in proportion to the size of the orifice through which the filtered liquid is being metered.

Another purpose is the provision of an improved float chamber and filter means in which a plurality of oil outlets are employed, an adjustable and controllable filter being applied either to one or both.

Other purposes will appear from time to time in the course of the specification and claims.

I illustrate my invention more or less diagrammatically in the accompanying drawing wherein.

Like parts are indicated by like symbols throughout the specification and drawing.

Figure 1:
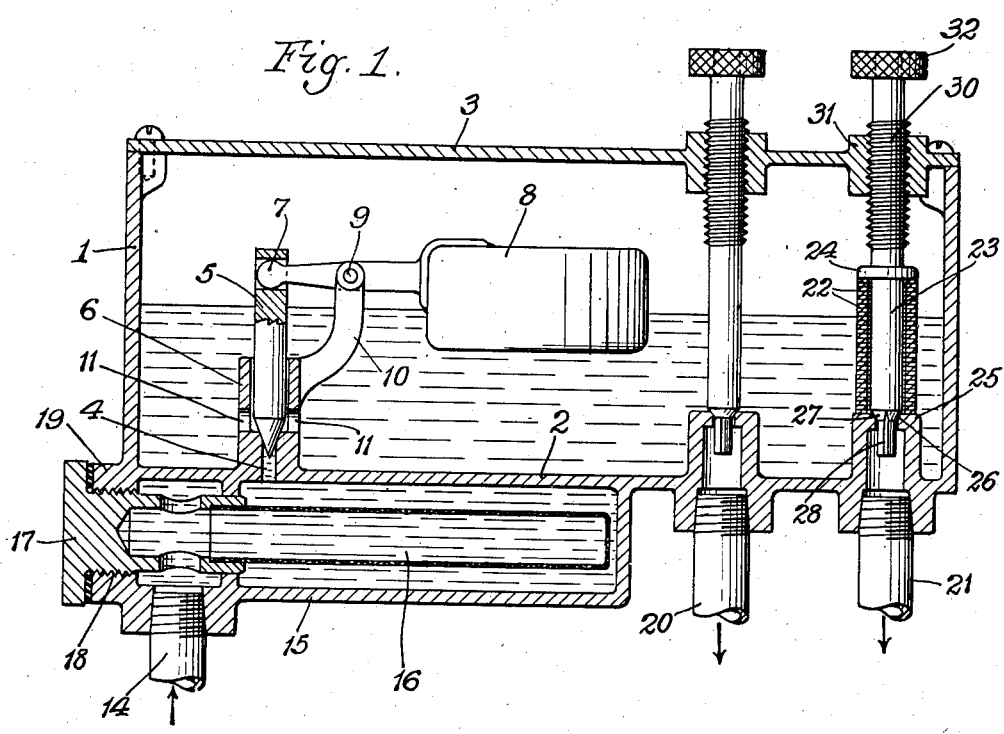
Fig. 1 is a vertical longitudinal section through one form of my device.

Referring to the drawing, 1 generally indicates a float chamber having for example a bottom portion 2 and a preferably removable cover plate 3. 4 indicates a fuel inlet passage, which may be controlled for example by a valve stem 5, slidable in a sleeve 6 and controlled for example by the lever member 7 of a float 8, which may be pivoted, as at 9, for example on an arm 10 extending upwardly and outwardly from the sleeve 6. 11 are any suitable oil inlet apertures which it may be desired to form in the sleeve 6.

14 indicates a fuel inlet duct from any suitable source of supply. It may for example, communicate with a filter housing generally indicated at 15, in which is located a filter tube or the like 16, which may be of cloth, wire, mesh or the like. This filter would be generally of coarser mesh than the below described filter within the float chamber proper. The filter member 16 may be mounted on a removable plug 17, which may for example be screw threaded as at 18 for engagement with the outwardly extending boss 19 on the housing 15.

I illustrate in Fig. 1 two fuel outlet ducts 20 and 21. In Fig. 1 I illustrate my filter means as applied to only one of these ducts, but it will be realized that if desired the filtering means may be applied to both. An example of the employment of such a double outlet duct structure is the employment of one outlet 20, which is employed for example for full stage combustion and where the valve is therefore on the fine side, and filtering means may under such circumstances not be necessary. In such case the outlet 21 would be used for the pilot stage, where a small and carefully metered and very constant flow of fuel is necessary, and where, therefore, a very small clearance is necessary between the opposed valve and valve seat members and a fine filter becomes a matter of importance.

Referring for example to the filter I have shown in Fig. 1, I may employ a plurality of springlike discs 22, surrounding the valve stem 23 and compressed between an abutment or ring 24, adjustable on the valve stem 23, and a fixed abutment 25 adjacent to or formed as part of the valve seat structure 26. It will be observed that the valve stem 23 has a valve member 27 conforming generally to the seat 26. If desired, any suitable metering slots or channels 28 may be formed.

Any desirable means for adjusting the valve may be employed, and it will be understood that any suitable automatic controls may be used. However, since the controls do not of themselves form part of the present invention, I merely illustrate a manual setting means for the valve, including the screw threaded extension 30 of the valve stem, which is screw threaded in a boss or sleeve 31 of the cover plate 3. 32 indicates any suitable manual control knob whereby the valve stem may be rotated.

Figure 2:
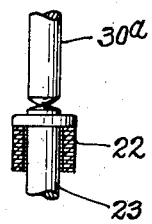
Fig. 2 is a partial section through a variant form.

It will be understod that, as the valve stem is rotated from closed to open position, the abutment 24 is moved upwardly or from the fixed abutment 25, and the result is that the spring discs 22 tend to separate and to increase the space therebetween. It will be observed that there is, therefore, a proportional relationship between the fineness of the setting of the valve and the mesh or interstices provided by the filter.

Where automatic control means are employed I may, as in Fig. 2, show a separation between the valve stem 23 and the upper or operating portion 30a, and in that event the filter may serve as spring means for raising the valve and valve stem as far as the control portion or member 30a will permit, this control being operated by any suitable, preferably automatic, means not herein shown.

Figure 3:
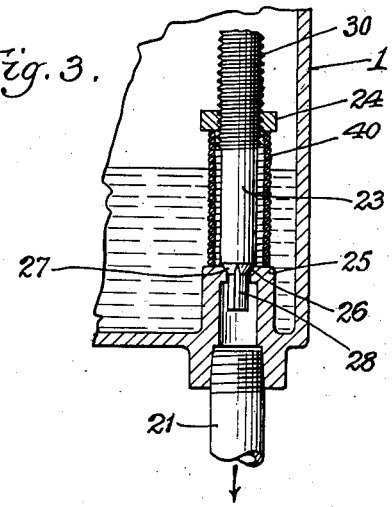
Fig. 3 is a partial section through another variant form.

As to Fig. 3, I illustrate the employment of a coil spring 40 in the place of the multiplicity of spring discs 22. It operates, however, in the same general manner, namely, to permit an increased opening of the filter in proportion as the valve orifice is also opened.

Either form of filter, whether coil spring or spring disc, may be employed with a single outlet passage or with two outlet passages. Also, in each case the filter may be employed with only one of two passages, or with both. Where but a single passage is employed it will be understood that when the valve is closely set, the filter, means herein shown will provide a very fine mesh filter, which is necessary when a very closely set small valve aperture is employed. On the other hand, when the valve is opened to full fire position, the mesh or apertures of the filter are widely opened, and the consequent flow of fuel is effective to wash through whatever small impurities may have gathered in the filter, these impurities or particles being then able easily to pass through the large valve opening. In effect, this valve opening and the filter openings are thus flushed out by the flow of the fuel so that both the valve aperture and the filter are cleaned, ready for the ensuing fine setting. Where two valves and valve passages are employed, I may if desired have a coarser filter for the passage 20 and a finer filter for the outlet passage 21.

It will be realized that, whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

I claim:

1. In combination, a valve seat and a movable valve member, means for moving the valve member toward the valve seat, the valve seat and the valve member defining a valve aperture, and a spring strainer structure surrounding said valve aperture, urging said valve member away from said valve seat, means for maintaining said spring strainer structure under compression, and for increasing its compression in response to the movement of the valve member toward the valve seat.

2. In combination, a valve seat and a movable valve member, means for moving the valve member toward and away from the valve seat, the valve seat and the valve member defining a valve aperture, and a spring strainer structure surrounding said valve aperture, means for maintaining said spring strainer structure under compression and for increasing its compression in unison with the movement of the valve member toward the valve seat.

3. In combination, a liquid container, a valve seat located in said container below the normal level of the liquid therein, a movable valve member, means for moving the valve member toward and away from the valve seat, the valve seat and the valve member defining a valve aperture, a spring strainer structure surrounding said valve aperture, and extending below the level of the liquid in the container, means for maintaining said spring strainer structure under compression, and for increasing its compression in unison with the movement of the valve member toward the valve seat.

4. In combination, a liquid container, a valve seat located in said container below the normal level of the liquid therein, a movable valve member, means for moving the valve member toward and away from the valve seat, the valve seat and the valve member defining a valve aperture, a spring strainer structure surrounding said valve aperture and extending below the level of the liquid in the container, means for maintaining said spring strainer structure under compression, and for increasing its compression in unison with the movement of the valve member toward and away from the valve seat, including a spring abutment adjacent the valve seat and an opposed spring abutment movable with the valve member, the spring strainer structure being normally compressed between said abutments.

5. In combination, a liquid container, a valve seat located in said container below the normal level of the liquid therein, a movable valve member, means for moving the valve member toward and away from the valve seat, the valve seat and the valve member defining a valve aperture, a spring strainer structure surrounding said valve aperture, and extending below the level of the liquid in the container, means for maintaining said spring strainer structure under compression, and for increasing its compression in unison with the movement of the valve member toward and away from the valve seat including a spring abutment adjacent the valve seat and an opposed spring abutment movable with the valve member, the spring strainer structure being normally compressed between said abutments, the spring strainer including a coil spring.

6. In combination, a liquid container, a valve seat located in said container below the normal level of the liquid therein, a valve stem and means for moving it along a defined axis toward and away from said valve seat, said stem including a portion adapted to be opposed to said valve seat and to define with said valve seat a valve aperture, a coil spring strainer structure surrounding said valve stem and extending below the level of the liquid, a lower abutment for said coil spring, associated with and exterior to the valve seat, an upper abutment for said coil spring, associated with said valve stem, and means for moving said valve stem and upper abutment toward the valve seat and lower abutment, and for thereby diminishing the effective valve aperture and increasing the compression of the coil spring, and the width of the gap between opposed coils of the spring.

JAMES L. BREESE.